(12) United States Patent
Liao

(10) Patent No.: US 8,771,543 B2
(45) Date of Patent: *Jul. 8, 2014

(54) CONDUCTIVE REINFORCING MATERIAL, NEGATIVE ELECTRODE MATERIAL AND NEGATIVE ELECTRODE

(75) Inventor: Chungpin Liao, Taichung (TW)

(73) Assignee: iNNOT BioEnergy Holding Co., George Town (KY)

(*) Notice: Subject to any disclaimer, the term of this patent is extended or adjusted under 35 U.S.C. 154(b) by 229 days.

This patent is subject to a terminal disclaimer.

(21) Appl. No.: 13/076,147

(22) Filed: Mar. 30, 2011

(65) Prior Publication Data

US 2012/0145969 A1 Jun. 14, 2012

(30) Foreign Application Priority Data

Dec. 13, 2010 (CN) .......................... 2010 1 0585284

(51) Int. Cl.
*H01M 4/88* (2006.01)

(52) U.S. Cl.
USPC .......... 252/182.1; 252/512; 252/513; 419/19; 427/58; 429/213; 429/222; 429/235

(58) Field of Classification Search
USPC ............ 252/182.1, 512, 513; 427/58; 419/19; 429/213, 222, 235
See application file for complete search history.

(56) References Cited

U.S. PATENT DOCUMENTS

| 3,055,963 | A | * | 9/1962 | Krebs .......................... 429/222 |
| 4,077,816 | A | * | 3/1978 | Nadkarni ........................ 419/19 |
| 6,511,774 | B1 | | 1/2003 | Tsukuda et al. |
| 6,905,798 | B2 | | 6/2005 | Tsukuda et al. |
| 7,405,172 | B2 | | 7/2008 | Shigematsu et al. |
| 2003/0170543 | A1 | * | 9/2003 | Headrick et al. ............... 429/235 |
| 2009/0325067 | A1 | | 12/2009 | Liao et al. |

FOREIGN PATENT DOCUMENTS

TW I288495 B 10/2007

* cited by examiner

*Primary Examiner* — Khanh Tuan Nguyen
(74) *Attorney, Agent, or Firm* — Novak Druce Connolly Bove + Quigg LLP

(57) ABSTRACT

A conductive reinforcing material used to form a negative electrode material is provided in the present invention. The conductive reinforcing material includes metal shavings containing elements selected from a group consisting of group II elements, group III elements and group VII elements. A negative electrode material and a negative electrode both with the conductive reinforcing material are also provided in the present invention.

20 Claims, 6 Drawing Sheets

S1 preparing the first element 11 into a first membrane

S2 preparing a second membrane on the first membrane from the second element 12

S3 laying the third element 13 on the second membrane to form a third membrane

FIG. 4

CONDUCTIVE REINFORCING MATERIAL, NEGATIVE ELECTRODE MATERIAL AND NEGATIVE ELECTRODE

CROSS-REFERENCE TO RELATED APPLICATION

This application claims priority of Chinese Patent Application No. 201010585284.7, filed on Dec. 13, 2010, entitled "Conductive Reinforcing Material, Negative Electrode Material And Negative Electrode" by Chungpin Liao, the disclosure of which is incorporated herein by reference in its entirety.

FIELD OF THE INVENTION

The present invention relates to an electrode material, and more particularly to a conductive reinforcing material, a negative electrode material and a negative electrode.

BACKGROUND OF THE INVENTION

In recent years, mobile phones, portable cameras, notebooks, digital cameras, personal digital assistants (PDAs), CD players, as well as other portable electronic devices, are becoming popular owing to their lightweight and small size. As a consequence, batteries used to power these portable devices have also become the focus of public concern. There are different types of batteries, including dry batteries, alkaline batteries, nickel-hydrogen batteries, etc. In the following, a brief introduction is given to the most commonly adopted batteries, and in particular, to their negative electrode materials.

The zinc-manganese battery, also known as the zinc-carbon battery, is one of the most common types of dry batteries. The key feature for a typical such battery is that there is a cylindrical zinc pot surrounding the negative pole for the storage of chemicals, such as the electrolyte solution.

Within typical nickel-hydrogen batteries, hydrogen storage alloy is adopted as the negative electrode material, which plays a key role in the electricity releasing performance of such batteries.

In a fuel cell, the electrolyte substance, serving as the filter for moving ions, is filled in-between the porous positive electrodes and the negative electrodes. To ignite the desired chemical reaction, normally the positive and the negative electrodes would need the supply of air (oxygen) and hydrogen, respectively.

Although some new types of zinc-carbon batteries, alkaline batteries, and secondary batteries are allegedly environment-benign, they in fact largely contain substantial amounts of mercury and other heavy metals, such as the cobalt. Other than that, environmental pollutants are frequently used or released during the manufacturing processes of such batteries.

Lithium batteries, though widely adopted as the largest energy content among portable batteries, are unstable in the electrochemical reactions. In the worst case, explosions occur due to thermal runaway as the result of operating at low load or under improper assemblage. Therefore, multiple and complex protection mechanisms would need to be implemented for their usage, such as the installation of a protection circuit, an exhaust vent, and separation membranes, etc.

The price of the lithium batteries rises rapidly as a result of the depletion of lithium mineral, which is the main raw material of the positive electrode (such as $Li1-xCoO_2$) and the negative electrode (such as $Li_xC$) of lithium batteries. Furthermore, the performance and life of the lithium batteries decrease rapidly within a high temperature environment.

SUMMARY OF THE INVENTION

The present invention provides a conductive reinforcing material, a negative electrode material and a negative electrode that may avoid the problem encountered with conventional battery of high internal resistance. The advantages of the present invention will be understood more readily after a consideration of the drawings and the detailed description of the preferred embodiments.

BRIEF DESCRIPTION OF THE DRAWINGS

The present invention will become more fully understood from the detailed description given herein below for illustration only, and thus are not limitative of the present invention, and wherein:

FIG. 4 is a flow chart illustrating a manufacturing process of the organic negative electrode of FIG. 1;

DETAILED DESCRIPTION OF THE INVENTION

Reference will now be made to the drawings to describe an exemplary embodiment in detail.

Figure 1:
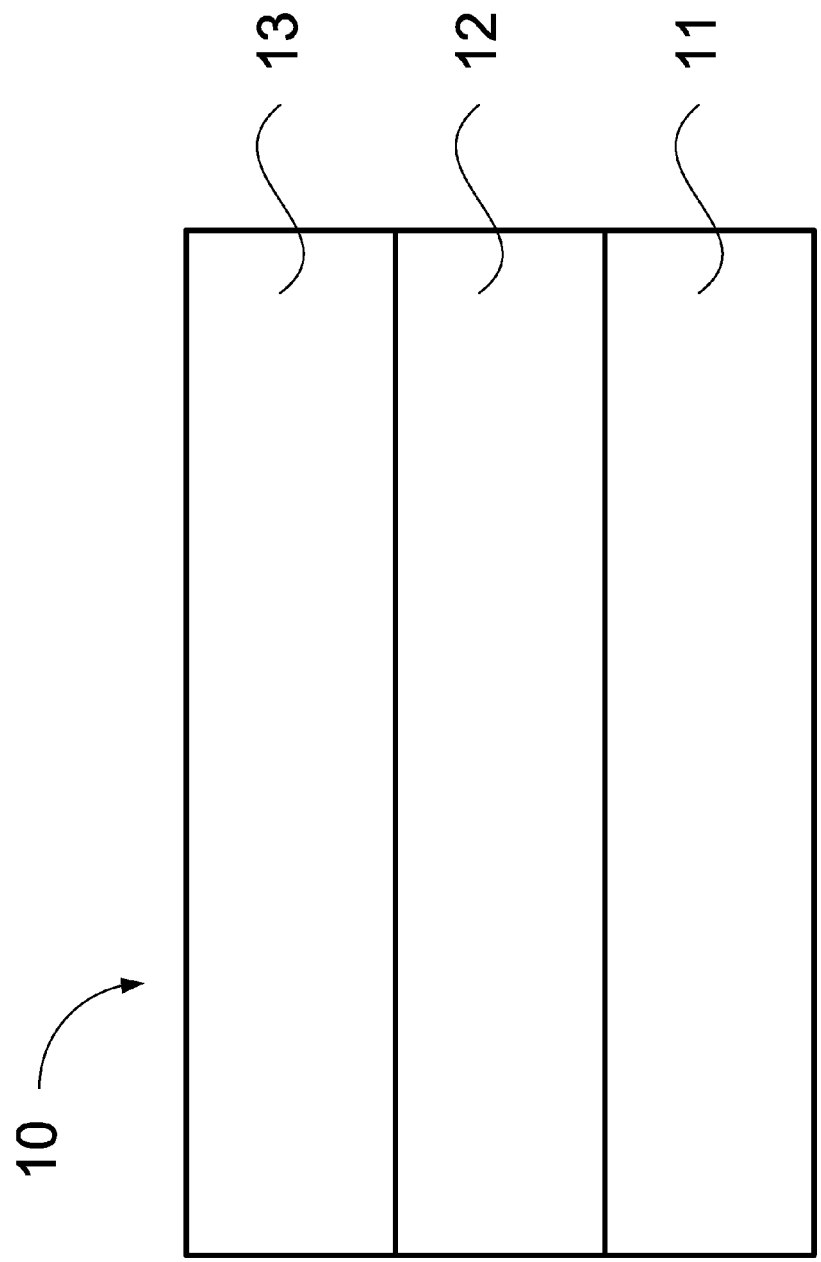
FIG. 1 is a schematic view of an organic negative electrode according to a first embodiment of the present disclosure.

As shown in FIG. 1, the organic negative electrode 10 includes a first element 11, a second element 12 formed on the first element 11, and a third element 13 formed on the second element 12.

The first element 11 comprises a conductive material. The conductive material can be a metal or a metallic compound or conductive polymeric material. The metal includes aluminum, gold, or the like. The metallic compound can be selected from the group consisting of manganese protoxide, zinc oxide, and magnesium oxide. The conductive polymeric material can be selected from the group consisting of heterocycle or aromatic heterocyclic compound. Preferably, the conductive material can be selected from the group consisting of polyacetylene, poly (arylene vinylene), polythiophene, polyaniline, polypyrrole, and the derivatives thereof. Alternately, an insulating material can be added into the conductive material.

The second element 12 is prepared from a high polymer solution and formed on the first element 11. The high polymer solution is used as an adhesive material sticking to the first element 11, and hence the third element 13 can properly adhere to the first element 11. The high polymer solution further functions to adjust the physical and chemical properties of the first element 11. For instance, the high polymer solution can adjust a work function of the first element 11 so as to achieve a desired potential difference, such as about 1.5V, between the positive electrode and the negative electrode of a battery. Moreover, the electric conductivity of the high polymer solution is within a range of about 50 ms/cm to about 250 ms/cm. The high polymer solution may comprise elements selected from the group consisting of boron, magnesium, aluminum calcium, manganese, and zinc.

The high polymer solution is prepared from a compound of metal ions and acid ions, high polymer, and solvent each with a concentration from about 0.1 mol/L to about 10 mol/L. The high polymer can be a high polymer of glucose. The high polymer of glucose can be selected from the group consisting of potato starch, water chestnut starch, corn starch, sweet potato starch, lotus root starch, mustard powder, and pueraria powder. The compound of metal ions and acid ions can be calcium carbonate. The compound of metal ions and acid ions can be natural phytochemicals, including lignans, oligosaccharides, polysaccharides, flavonoids, iridoids, fatty acids, scopoletin, catechin, beta-sitosterol, damnacanthal, and alkaloids. The solvent can be water. The pH value of the high polymer solution is about 5.5 to 8. The high polymer solution may further comprise vitamin, such as vitamin D.

The third element 13 comprises chlorophyll and is formed on the second element 12. The chlorophyll can be selected from the group consisting of chlorophyll a, chlorophyll b, chlorophyll c1, chlorophyll c2, chlorophyll d, and chlorophyll e. Typically, the chlorophyll, from which the chlorophyll oxidase may have been removed, can be in powder or in liquid form.

The first element 11, the second element 12, and the third element 13 each can be made into a membrane to enlarge the contact area of the chlorophyll so as to increase the response area of the battery, and subsequently the utilization rate of the chlorophyll. Alternately, any known method can be used to increase the utilization rate of the chlorophyll and enlarge the contact area. It is noted that the third material 13 may alternatively be a part of the second material 12 to achieve the same effect.

When the organic negative electrode of a battery operates, the reaction center of chlorophyll in the negative electrode material releases electrons as it receives light, touches the electrolyte, if any, or is electrically connected with the positive electrode. The potential difference occurs between the positive electrode and the negative electrode when the electrons migrate to the positive electrode of the battery. A continuous current results when a conducting wire and a load electrically connect the positive electrode to the negative electrode.

Figure 2:
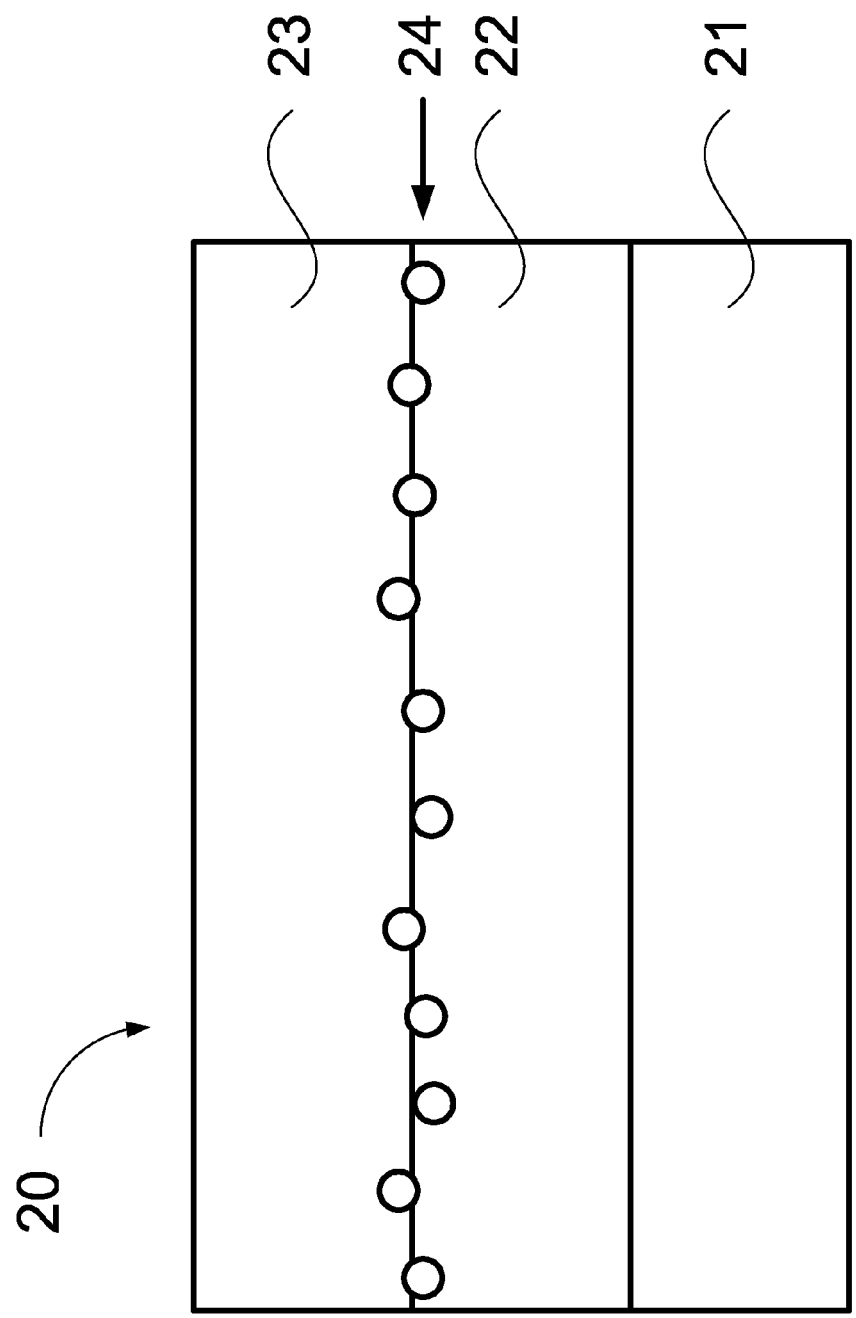
FIG. 2 is a schematic view of an organic negative electrode according to a second embodiment of the present disclosure.

As shown in FIG. 2, the organic negative electrode 20, according to the second embodiment of the present disclosure, may comprise a first element 21, a second element 22, a third element 23, and an additional material 24.

The configuration of the first element 21, the second element 22, and the third element 23 are substantially the same as that of the first element 11, the second element 12, and the third element 13 mentioned above. The additional material 24 that comprises metal shavings can be disposed between the second element 22 and the third element 23. The metal shavings can be arranged on the contact surface of the third element 23 between the second element 22 by spreading or coating. Alternately the metal shavings may form a separate element between the second element 22 and the third element 23. The metal shavings could enhance the electrode conductivity of the organic negative electrode. The metal shavings can be elements selected from the group consisting of group II elements, group III elements or group VII elements. The group II elements can be selected from the group consisting of magnesium, calcium and zinc. The group III elements can be selected from the group consisting of boron and aluminum. The group VII elements can be selected from the group consisting of manganese and ferrum. The weight of the metal shavings, which can be within a range of 0.5 g to 12 g, is about 1% to 25% of the weight of the organic negative electrode.

Figure 3:
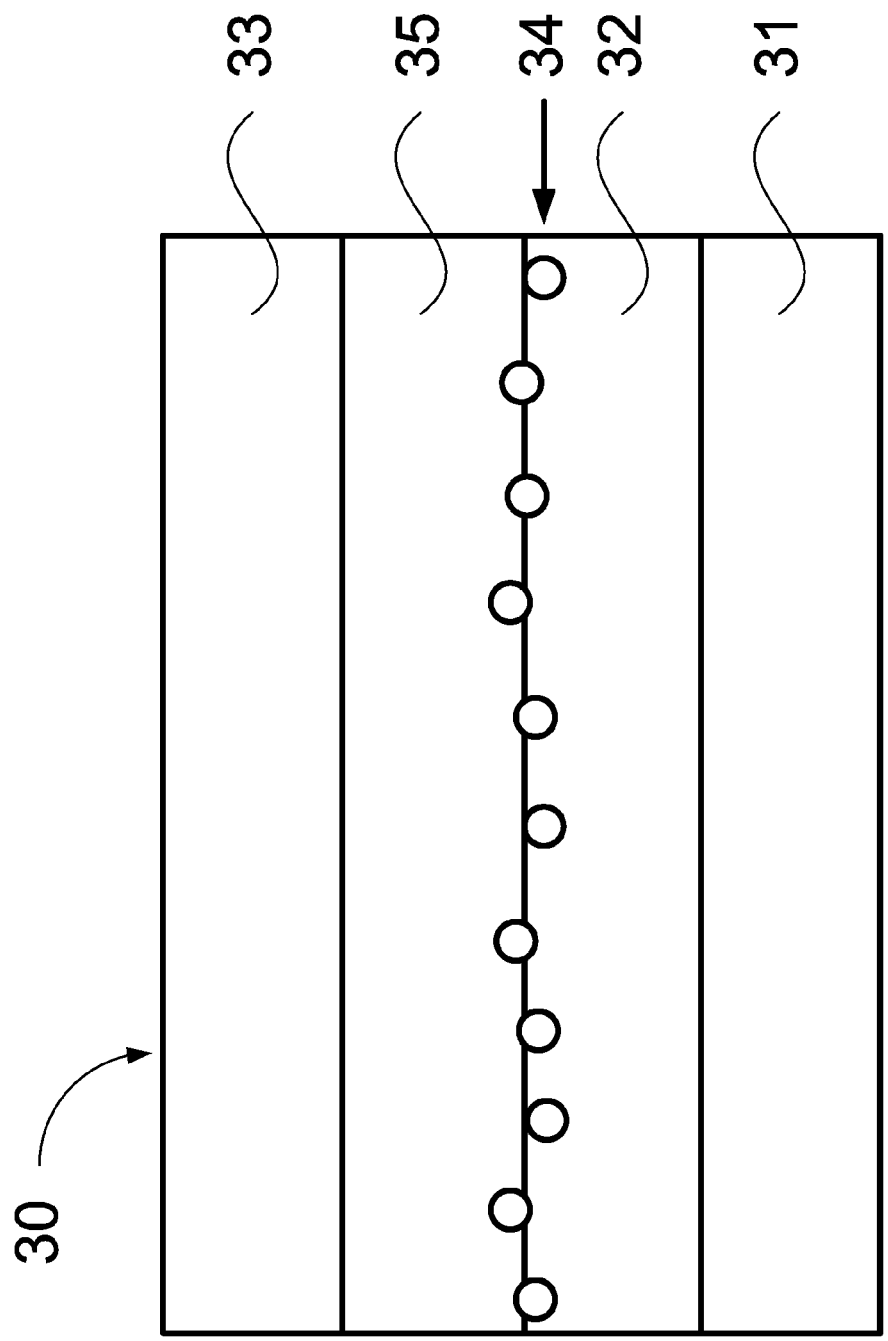
FIG. 3 is a schematic view of an organic negative electrode according to a third embodiment of the present disclosure.

FIG. 3 is a schematic view of an organic negative electrode according to the third embodiment of the present disclosure. As shown in FIG. 3, the organic negative electrode 30 may comprise a first element 31, a second element 32, a third element 33, an additional material 34, and a fourth element 35. The configuration of the first element 31, the second element 32, the third element 33, and the additional material 34 are substantially the same as the configuration of the first element 21, the second element 22, the third element 23, and the additional material 24 mentioned above.

The fourth element 35 that comprises an organic separation membrane can be disposed between the second element 32 and the third element 33. The organic separation membrane can be high-fiber materials with adsorbed organic or inorganic salt solution. The high-fiber materials can be paper material, including cellophane, cotton paper, and rice paper. The diametric length of the pore of the high-fiber material prefers to be about 0.01 µm to 1 cm. The electric conductivity of the organic or inorganic salt solution can be about 10 ms/cm to 500 ms/cm. The salt, which is non-lithium salt, can be ionic compounds selected from the group consisting of sodium iodide, sodium chloride and sodium hydroxide.

A battery could be prepared from the organic negative electrode mentioned in the foregoing embodiments.

FIG. 4 is a flow chart illustrating a manufacturing process of the organic negative electrode of FIG. 1. As shown in FIG. 4, the process comprises the following steps:

Step S1: preparing the first element 11 into a first membrane;

Step S2: preparing a second membrane on the first membrane from the second element 12; and Step S3: laying the third element 13 on the second membrane to prepare a third membrane.

Figure 5:
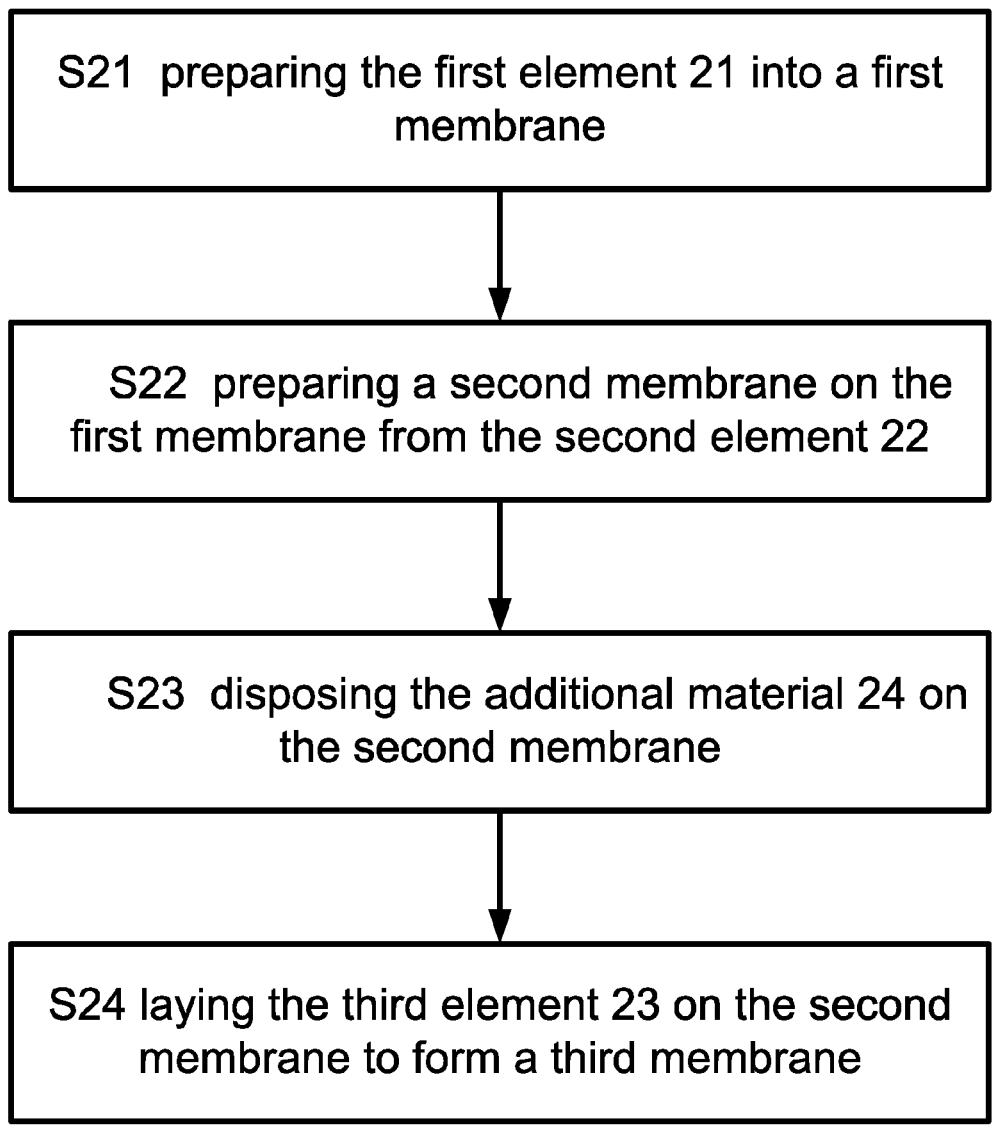
FIG. 5 is a flow chart illustrating a manufacturing process of the organic negative electrode of FIG. 2.

FIG. 5 is a flow chart illustrating a manufacturing process of the organic negative electrode of FIG. 2. As shown in FIG. 5, the process comprises the following steps:

Step S21: preparing the first element 21 into a first membrane;

Step S22: preparing a second membrane on the first membrane from the second element 22;

Step S23: disposing the additional material 24 on the second membrane; and

Step S24: laying the third element 23 on the second membrane to prepare a third membrane.

Figure 6:
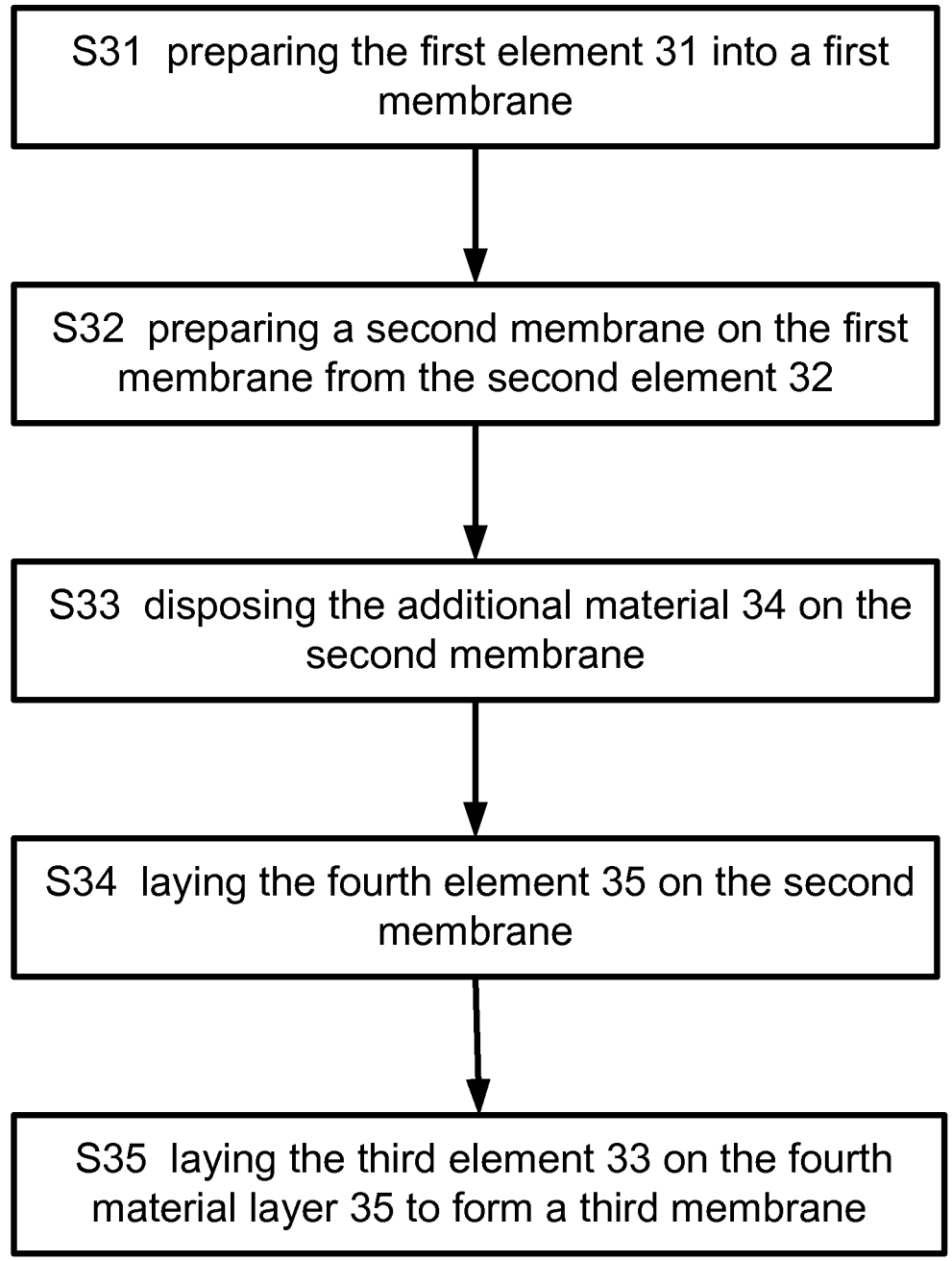
FIG. 6 is a flow chart illustrating a manufacturing process of the organic negative electrode of FIG. 3.

FIG. 6 is a flow chart illustrating a manufacturing process of the organic negative electrode of FIG. 3. As shown in FIG. 6, the process comprises the following steps:

Step S31: preparing the first element 31 into a first membrane;

Step S32: preparing a second membrane on the first membrane from the second element 32;

Step S33: disposing the additional material 34 on the second membrane;

Step S34: laying the fourth element 35 on the second membrane; and

Step S35: laying the third element 33 on the fourth element 35 to prepare a third membrane.

Any known method can be used to form the third membrane on the second membrane in the above-described process, such as forming the third membrane on the second membrane from the third element by pressing when the third element is in powder state, or by spreading when the third element is in liquid state.

Any known method can be used to put the additional material on the second membrane in above-described process. For example, the second membrane can be doped with the additional material (such as metal shavings).

The steps S1, S21, and S31 further comprise the step of roughening the surface of the first membrane. The area of the first membrane can be 5 cm×5 cm, 5 cm×10 cm, or 10 cm×10 cm.

In the steps S2, S22, and S32 mentioned above, the second element is spread onto the first membrane and then dried up in an oven so that the second membrane formed by the second element sticks to the first membrane. For example, the second element of about 0.5 mm in thickness can be spread onto the first membrane and then dried up in the oven at about 100° C. for about 6 minutes.

The organic negative electrode and the battery of the present disclosure could store hydrogen by the chlorophyll in the third element and have the outstanding characteristics of low internal resistance and high electricity storage capacity. Namely, during the oxidation-reduction chemical reaction, the chlorophyll molecule would lose a magnesium ion in its porphyrin center to become the pheophytin molecule. The two empty bonding sites of the latter then trap two hydrogen ions to practically store hydrogen and make the running of current smooth. Not only is the manufacturing process of the organic negative electrode simple, robust, and economical, but only natural, non-toxic substances are employed, unlike conventional batteries and solar cells, the battery of the present disclosure will not cause environmental pollution even when discarded after being used.

It should be noted that the terms "first", "second", "third" and other terms in the present disclosure are only used as textual symbols as the circumstances may require, and thus the practice is not limited to these terms. It should be further noted that these terms can be used interchangeably.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. A conductive reinforcing material used as a negative electrode material comprising metal shavings, wherein the metal shavings are elements selected from the group consisting of magnesium, calcium, boron and manganese.

2. The conductive reinforcing material of claim 1, wherein the weight of the metal shavings is within a range of 1% to 25% of the weight of a negative electrode.

3. A negative electrode material comprising the conductive reinforcing material of claim 1.

4. A negative electrode comprising the conductive reinforcing material of claim 1.

5. The negative electrode of claim 4, further comprising a first element, a second element, and a third element, wherein the second element is formed on the first element, the third element is formed on the second element, and the metal shavings are disposed between the second element and the third element.

6. The negative electrode of claim 5, wherein the metal shavings are arranged on a contact surface of the third element between the second element.

7. The negative electrode of claim 5, wherein the metal shavings separate the second element from the third element.

8. The negative electrode of claim 5, wherein the weight of the metal shavings is within a range of 1% to 25% of the weight of a negative electrode.

9. The negative electrode of claim 5, wherein the first element comprises a conductive material, the second element is prepared from a polymer solution which is applied to the first element to cause physical and chemical reactions with the first element, and the third element comprises chlorophyll.

10. The negative electrode of claim 9, wherein the conductive material comprises one of a metal, a metallic compound, and conductive polymeric material.

11. The negative electrode of claim 10, wherein the metal comprises one of aluminum, and gold, the metallic compound is selected from a group consisting of manganese protoxide, zinc oxide, and magnesium oxide, and the conductive polymeric material is selected from a group consisting of heterocycle and aromatic heterocyclic compound.

12. The negative electrode of claim 11, wherein the polymer is selected from a group consisting of potato starch, water chestnut starch, corn starch, sweet potato starch, lotus root starch, mustard powder, and pueraria powder, the compound of metal ions and acid ions is one of calcium carbonate and natural phytochemicalss, and the solvent is water.

13. The negative electrode of claim 12, wherein a pH value of the polymer solution is within a range of 5.5 to 8.

14. The negative electrode of claim 12, wherein the polymer solution further comprises vitamin.

15. The negative electrode of claim 9, wherein the chlorophyll is selected from a group consisting of chlorophyll a, chlorophyll b, chlorophyll c1, chlorophyll c2, chlorophyll d, and chlorophyll e.

16. The negative electrode of claim 15, wherein the chlorophyll is in one of powder and liquid form.

17. The negative electrode of claim 9, wherein each of the first element, the second element, and the third element is made into a membrane.

18. The negative electrode of claim 9, wherein the polymer solution is prepared from a compound of metal ions and acid ions, polymer, and solvent each with a concentration within a range of 0.1 mol/L to 10 mol/L.

19. The negative electrode of claim 5 further comprising a fourth element, wherein the fourth element comprises an organic separation membrane disposed between the second element and the third element, and the metal shavings are arranged on a contact surface of the fourth element between the second element.

20. The negative electrode of claim 19, wherein the organic separation membrane comprises high-fiber materials with one of adsorbed organic salt solution and adsorbed inorganic salt solution.

* * * * *